US 6,560,637 B1

(12) United States Patent
Dunlap et al.

(10) Patent No.: US 6,560,637 B1
(45) Date of Patent: May 6, 2003

(54) WEB-ENABLED PRESENTATION DEVICE AND METHODS OF USE THEREOF

(75) Inventors: Wayne Dunlap, San Jose, CA (US); Jeffrey C. Rodman, San Francisco, CA (US); Kristin Dunn, Los Gatos, CA (US); Rick VanderKam, Sunnyvale, CA (US); Samantha Kha, San Jose, CA (US); DahRenn Ba, Fremont, CA (US); Oden J. McMillan, Palo Alto, CA (US)

(73) Assignee: Polycom, Inc., Milpitas, CA (US)

( * ) Notice: Subject to any disclaimer, the term of this patent is extended or adjusted under 35 U.S.C. 154(b) by 0 days.

(21) Appl. No.: 09/452,800

(22) Filed: Dec. 2, 1999

Related U.S. Application Data
(60) Provisional application No. 60/110,670, filed on Dec. 2, 1998.

(51) Int. Cl.[7] .............................................. G06F 15/16
(52) U.S. Cl. ....................... 709/204; 709/218; 709/219
(58) Field of Search ................................. 345/335, 339; 395/329; 707/523; 709/204, 205, 206, 203, 218, 219

(56) References Cited

U.S. PATENT DOCUMENTS

| | | | | |
|---|---|---|---|---|
| 5,539,658 A | * | 7/1996 | McCullough | 395/329 |
| 5,862,330 A | * | 1/1999 | Anupam et al. | 709/204 |
| 5,944,791 A | * | 8/1999 | Scherpbier | 709/218 |
| 5,956,487 A | * | 9/1999 | Venkatraman et al. | 345/335 |
| 5,991,770 A | * | 11/1999 | Zamora-McKelvy et al. | 707/523 |
| 5,991,796 A | * | 11/1999 | Anupam et al. | 709/206 |
| 6,008,807 A | * | 12/1999 | Bretschneider et al. | 345/339 |
| 6,009,429 A | * | 12/1999 | Greer et al. | 709/218 |
| 6,108,687 A | * | 8/2000 | Craig | 709/203 |
| 6,233,605 B1 | * | 5/2001 | Watson | 709/204 |

OTHER PUBLICATIONS

Jorge H. C. Fernandes et al., Websteer: An Open Framework for Interactive Documentation and Training over the Web, INET 1997, 7th An Conf of Internet Society, 12 pages, Jun. 1997.*

Alvin Leung et al., User Guide for the NPAC Slideshow Viewer, Northeast Parallel Architectures Center at Syracuse University, 5 pages, Feb. 1996.*

* cited by examiner

Primary Examiner—Patrice Winder
(74) Attorney, Agent, or Firm—Carr & Ferrell LLP (57) ABSTRACT

A presentation device includes an embedded web server for transmitting images representative of presentation information to network-connected terminals concurrently with the display of such presentation information at the presentation site. The images may be viewed at the terminals by pointing a conventional web browser to a DNS name or IP address associated with the presentation device. Certain of the terminals may be given presenter privileges, wherein the users of the presenter terminals may control aspects of the presentation such as slide sequencing by engaging the appropriate controls displayed within the browser window. In this manner, presentations may be viewed and controlled remotely using a conventional browser interface.

11 Claims, 9 Drawing Sheets

FIG. 4 http://roomname.companyname.com/joinmeeting

Join as Presenter

Join as Viewer

WEB-ENABLED PRESENTATION DEVICE AND METHODS OF USE THEREOF

CROSS-REFERENCE TO RELATED APPLICATION

The present application claims the benefit of U.S. provisional Patent Application No. 60/110,670, filed on Dec. 2, 1998 and entitled "Network Interfaced Presentation Device and Methods of Use Thereof", which is hereby incorporated by reference.

BACKGROUND

1. Field of the Invention

The present invention relates generally to computers and communications equipment, and more particularly to a device for displaying presentations and for distributing presentations over a computer network.

2. Description of the Prior Art

Persons giving presentations frequently make use of presentation slides to display text and graphics to an audience. Historically, the slides consisted of transparencies which were projected onto a surface using an overhead projector. The use of transparencies has been largely supplanted by commercial presentation software applications, such as Microsoft PowerPoint. Presentation applications allow slides to be created and edited easily and quickly on a computer, and further enable the presenter to incorporate animation and multimedia effects into the presentation.

A typical mode of use of a presentation application involves creating a set of presentation slides and assembling the slides into a file, saving the file to the hard drive of a personal computer, and then transporting the computer to the presentation site. At the presentation site, the presenter connects the computer to a digital projector (such as an LCD projector) or other display device, starts the presentation application and opens the file. The application's output is directed to the digital projector so that the slides may be viewed by the audience located at the presentation site. The presenter may advance the slides and perform related operations by engaging the appropriate keys on the computer or on a remote control device in communication with the projector.

It is frequently desirable to expand the presentation's audience to include persons located remotely from the presentation site. The prior art includes various applications, such as Microsoft NetMeeting, which enable communication of presentation information and/or document sharing over a network between computers. However, such applications are frequently difficult to set up and configure, and each person desiring access to the presentation must have a copy of the application executing on his or her computer.

SUMMARY

An embodiment of the invention comprises a presentation device for displaying presentation information (typically consisting of slides and documents), and for simultaneously distributing the presentation information to remote terminals over a computer network. The presentation device is preferably provided with a network interface for connecting the presentation device to the computer network, and a web server for transmitting web pages containing presentation information to terminals located at nodes of the network. The presentation device is further equipped with an interface for connection to a digital projector or equivalent display device so that the presentation information may be viewed by the audience at the presentation site (i.e., the site at which the presentation device and projector are physically located).

According to a typical mode of operation, a user of a remote terminal accesses a presentation by pointing a conventional web browser to a DNS name associated with the presentation device. A slide or other presentation information being displayed at the presentation site is simultaneously displayed in a browser window of the remote terminal so that the remote terminal user may view the slide. In one embodiment, the presentation device is configured to convert slides from a proprietary format to a standard graphical format prior to transmission to the remote terminal so that the slide may be viewed within conventional browser without requiring special plug-ins or controls. Certain of the remote terminals may be given presenter privileges, wherein a presenter toolbar having presentation controls is displayed at the remote terminal, and the user may effect predetermined presentation-related operations (e.g., selecting a presentation file or advancing slides within a selected file) by engaging the appropriate controls on the toolbar. In this manner, persons located remotely from the presentation site may give presentations through manipulation of the controls.

The presentation device may additionally generate an archive file consisting of images of all slides and/or other presentation information displayed during a presentation session. The archive file may be stored at the presentation device for subsequent retrieval by remote terminals and/or may be printed so that the presentation participants receive a hard copy of the presentation for their records.

DETAILED DESCRIPTION OF PREFERRED EMBODIMENTS

Figure 1:
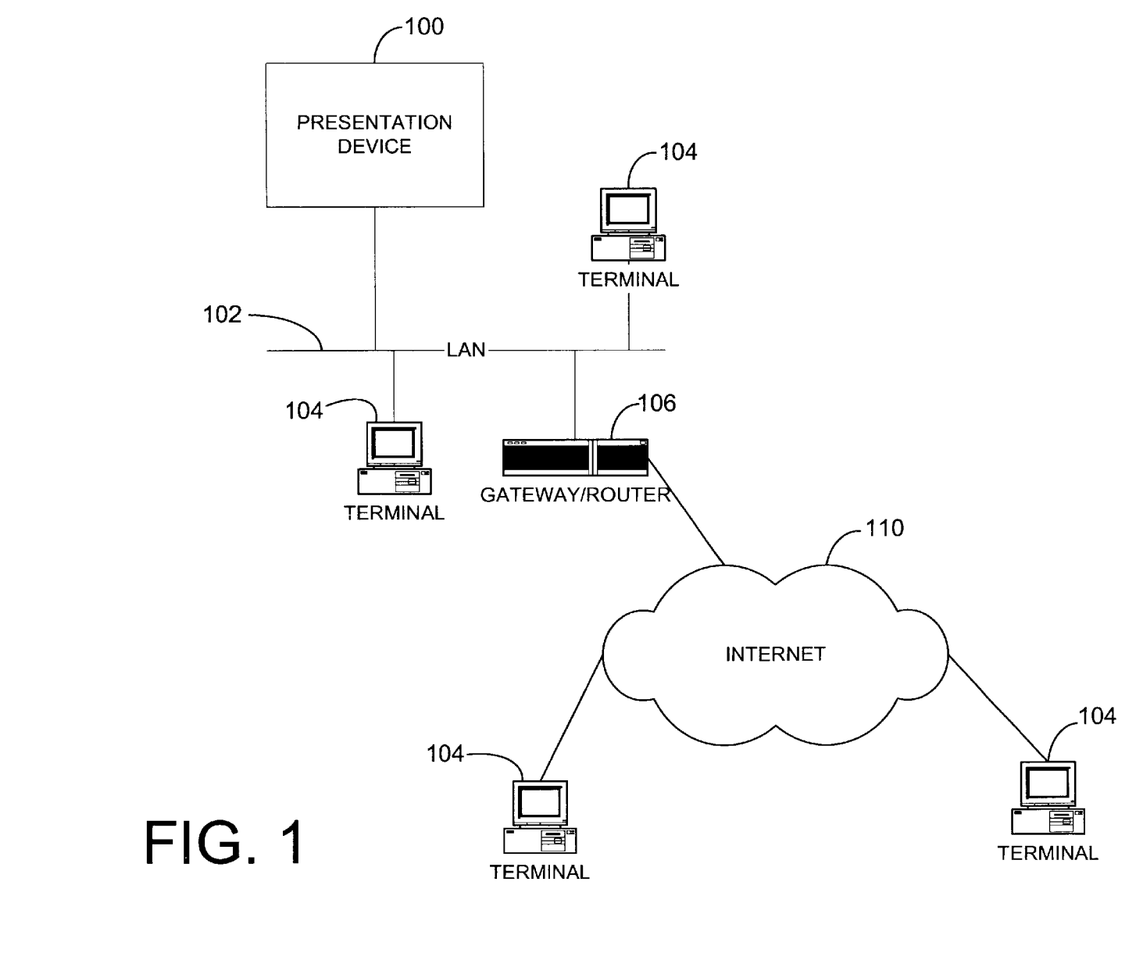
FIG. 1 is a depiction of an exemplary operating architecture of a presentation device, in accordance with one embodiment of the invention.

FIG. 1 depicts an exemplary operating architecture of an embodiment of the invention. A presentation device 100 is connected to a conventional local area network (LAN) 102 to enable communication with remote terminals (individually and collectively denoted as 104) located at nodes of LAN 102. LAN 102 may comprise, for example, an Ethernet network. As is known in the network art, each computer or device connected to LAN 102 is assigned a unique IP address. Presentation device 100 is preferably assigned a static IP address. Certain LAN-connected devices may also be given unique DNS names to allow easier identification thereof. For example, presentation device 100 may be given the DNS name "roomname.companyname.com". Name/address resolution is implemented by a domain name server located on LAN 104.

A router or gateway 106 located at a node of LAN 102 allows presentation device 100 and other LAN-connected devices to communicate with additional remote terminals 104 connected to the Internet 110. Terminals 104 will typically comprise personal computers (PCs), but may alternatively comprise any device capable of running a Java-enabled web browser, such as Netscape Navigator or Internet Explorer. Presentation device 100 is generally configured to display presentation information to persons co-located therewith (i.e., the audience at the presentation site) and to distribute the presentation information to terminals 104 over LAN 102 and/or Internet 110. The presentation information will typically consist of slides, documents and spreadsheets having text, graphics and/or numerical data.

The total number of remote terminals 104 which may simultaneously use the services of presentation device 100 (and hence the maximum number of terminals which may participate in a presentation session) will depend on limitations of network bandwidth and processor performance. In one commercial embodiment, presentation device 100 is capable of providing services to up to a total of 25 remote terminals 104. To accommodate of a greater number of terminals, an alternative operating architecture (not depicted) couples presentation device 100 to a conventional server which functions as a web server for presentation device 100 and may provide services to a significantly larger number of remote terminals 104.

Figure 2:
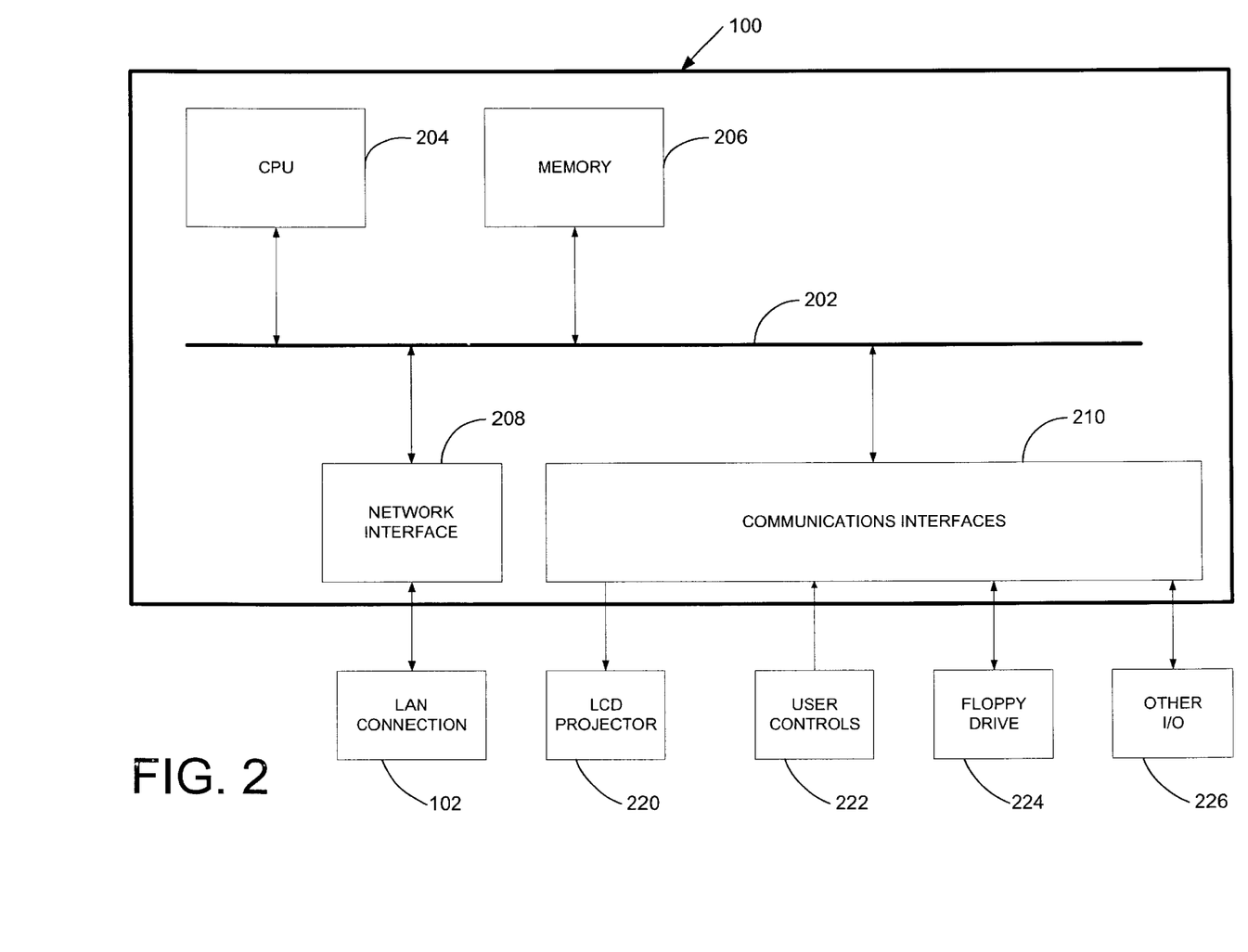
FIG. 2 is a block diagram of the presentation device of FIG. 1.

FIG. 2 depicts components of presentation device 100 interconnected for communication by at least one bus 202. Components of presentation device 100 include a central processing unit (CPU) 204, a memory 206, a network interface 208 and communication interfaces 210. CPU 204 interprets and executes instructions loaded from memory 206. Memory 206, which may variously include volatile RAM, non-volatile ROM and/or storage devices such as magnetic disk drives or CD-ROMs, stores executable programs, data files and other information. Network interface 208 enables connection of presentation device 100 to LAN 102. Network interface 208, which may comprise a conventional Ethernet card, mediates between presentation device 100 and the physical connection to LAN 102 in accordance with predetermined protocols. Physical interconnection of network interface 208 with LAN 102 may typically be effected using unshielded twisted pair and (thin or thick) coaxial cable.

Presentation device 100 is further provided with a set of communication interfaces 210 for connecting presentation device 100 to various peripherals. The peripherals may include, for example, an LCD projector 220 for projecting slides and other presentation information onto a surface for viewing by the audience located at the presentation site; a set of user controls 222 for selecting presentation files, advancing slides and the like; a floppy drive 224 for loading presentation files into memory 206, and other input/output devices 226, such as a printer or monitor, for receiving input from or presenting output to a user. The communication interfaces 210 may individually comprise any interface, such as a USB serial port interface, disk drive controller, etc., suitable for connecting presentation device 100 to the associated peripheral.

Figure 3:
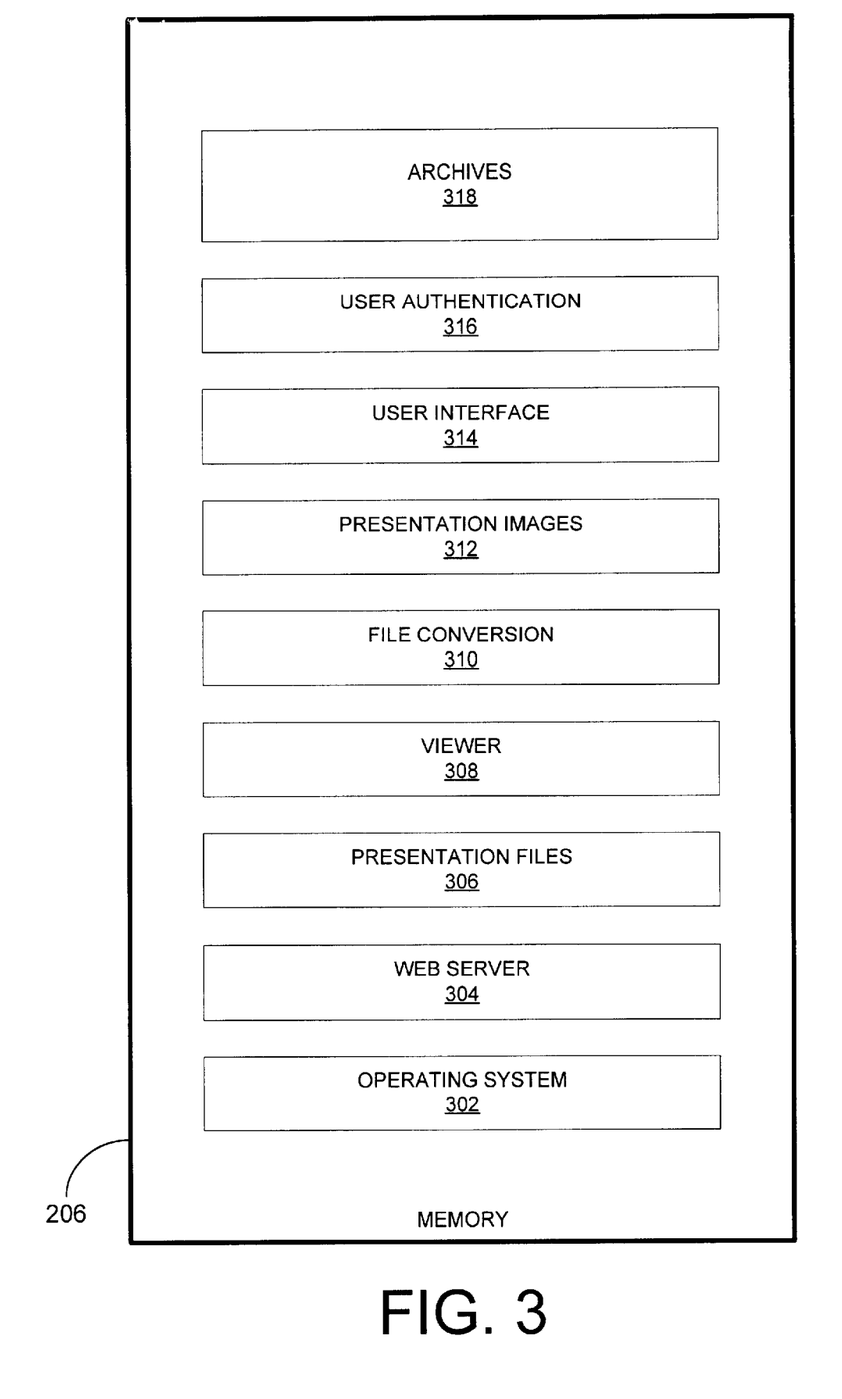
FIG. 3 is a block diagram showing contents of a memory of FIG. 2.

FIG. 3 depicts programs, files, and other data stored within memory 206. An operating system 302 controls the allocation and usage of hardware resources of presentation device 100. A web or HTTP server 304 utilizes the hypertext transfer protocol to serve HTML documents and associated files, scripts and instructions responsive to requests received from remote terminals 104. Slides, spreadsheets, documents and other presentation information which the presenter(s) desires to display and distribute during a presentation session are contained within presentation files 306, which may comprise, without limitation, PowerPoint, Word or Excel files. As will be discussed in further detail hereinbelow, presentation files 306 may be transmitted to presentation device 100 over LAN 102 and/or Internet 110, or may be loaded onto presentation device 100 using floppy drive 224.

Viewer 308 is configured to read a selected presentation file 306 and to cause the slides, documents, or other presentation information to be displayed by LCD projector 220. File conversion engine 310 is operative to convert the slides and documents stored in presentation files 306 to presentation image files 312 encoded in a standard graphical image format, such as JPEG or GIF, so that images 312 may be viewed by browser running on a terminal 104 without requiring special plug-ins or controls. User interface module 314 enables the user to load and select presentation files 306, control the display of slides and other presentation information, and perform other functions in connection with the operation of presentation device 100. User authentication routines 316 maintains a list of users authorized to view and/or present presentations, and performs authentication checks when terminals attempt to join a presentation session. Finally, archives 318 store images of all slides and other information displayed during a presentation session so that the images may be viewed or printed after the presentation session has been completed.

Figure 4:
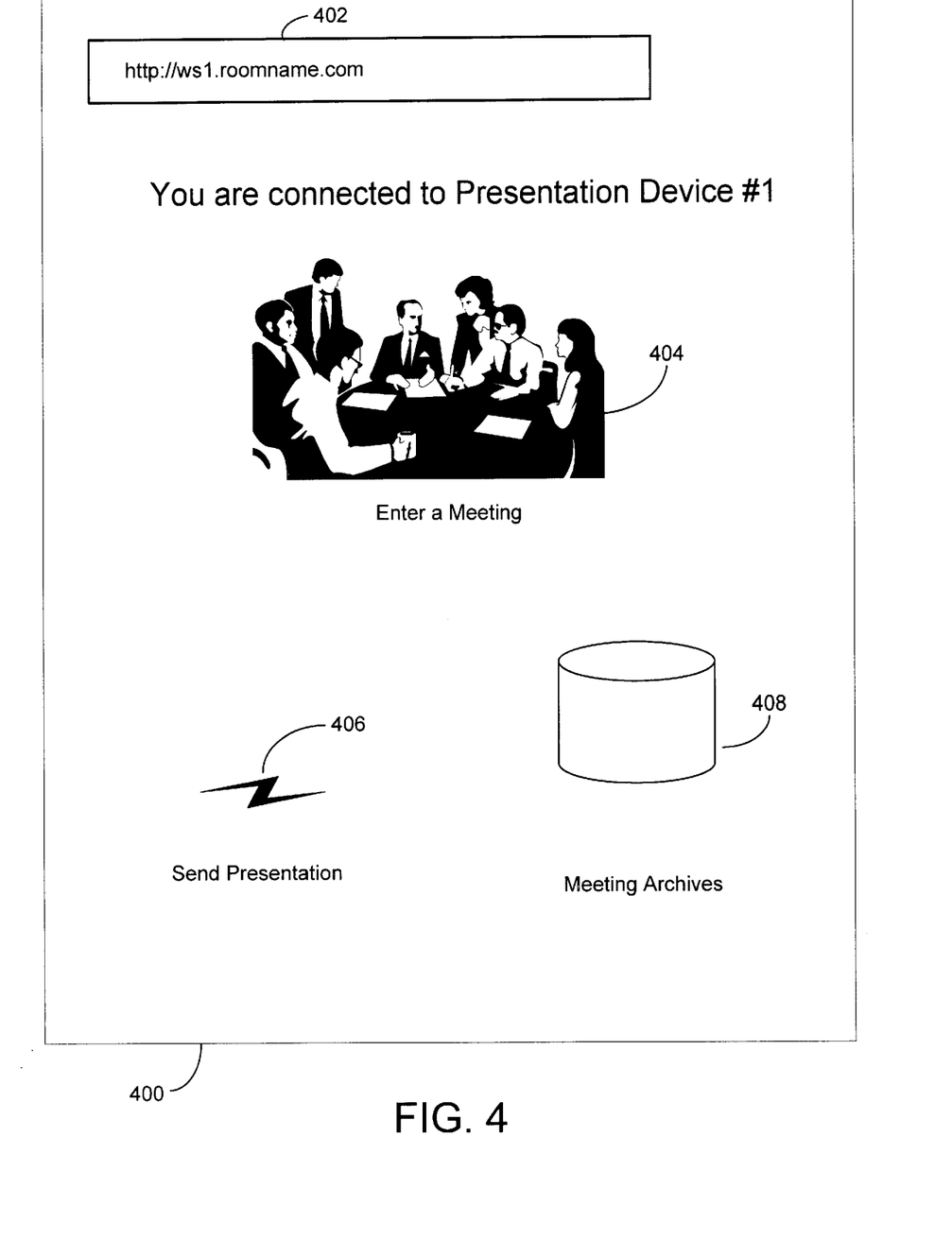
FIG. 4 is an exemplary home page associated with the presentation device.

FIGS. 4–7 depict exemplary web pages transmitted by web server 304 and displayed by a browser running on terminal 104. FIG. 4 depicts a home page 400 transmitted by web server 304 responsive to an initial connection request by terminal 104. Generally, terminal 104 accesses presentation device 100 by entering a URL including the domain name or IP address of presentation device 100 into location box 402 of a browser running on terminal 104. For example, the URL corresponding to the assigned DNS name of presentation device 100 may be in the form roomname.companyname.com and begin with the http://sequence. The browser responsively sends a web page request to presentation device 100 along Internet 110 and/or LAN 102. The web page request is directed to web server 304, which in turn transmits home page 400 (typically encoded in hypertext markup language (HTML)) to terminal 104. The browser receives and interprets home page 400 and causes it to be displayed to the user.

Home page 400 includes a set of options for further action by the user. The options are represented by text and/or graphics, and include embedded hypertext links referencing a corresponding web page. In the current example, home page 400 provides a "enter a meeting" option 404, a "send a presentation" option 406, and a "meeting archives" option 408. As will be discussed in further detail below, linking to "enter a meeting" option 404 allows the user of terminal 104 to view slides and other presentation information being displayed at the presentation site, and optionally to control various aspects of the presentation. Linking to "send presentation" option 406 allows the User to send a presentation file 306 (e.g., a PowerPoint file) stored at terminal 104, or at another network accessible location, to presentation device 100 so that the presentation information contained within the file may be displayed at the presentation site and distributed to other terminals 104. Finally, linking to "meeting archives" option 408 allows the user to view stored images of slides and other presentation information distributed during prior presentation sessions. The user of terminal 104 conventionally selects a desired option by maneuvering the mouse pointer over the text and/or graphics representative of the desired option and clicking the mouse button.

Figure 5:
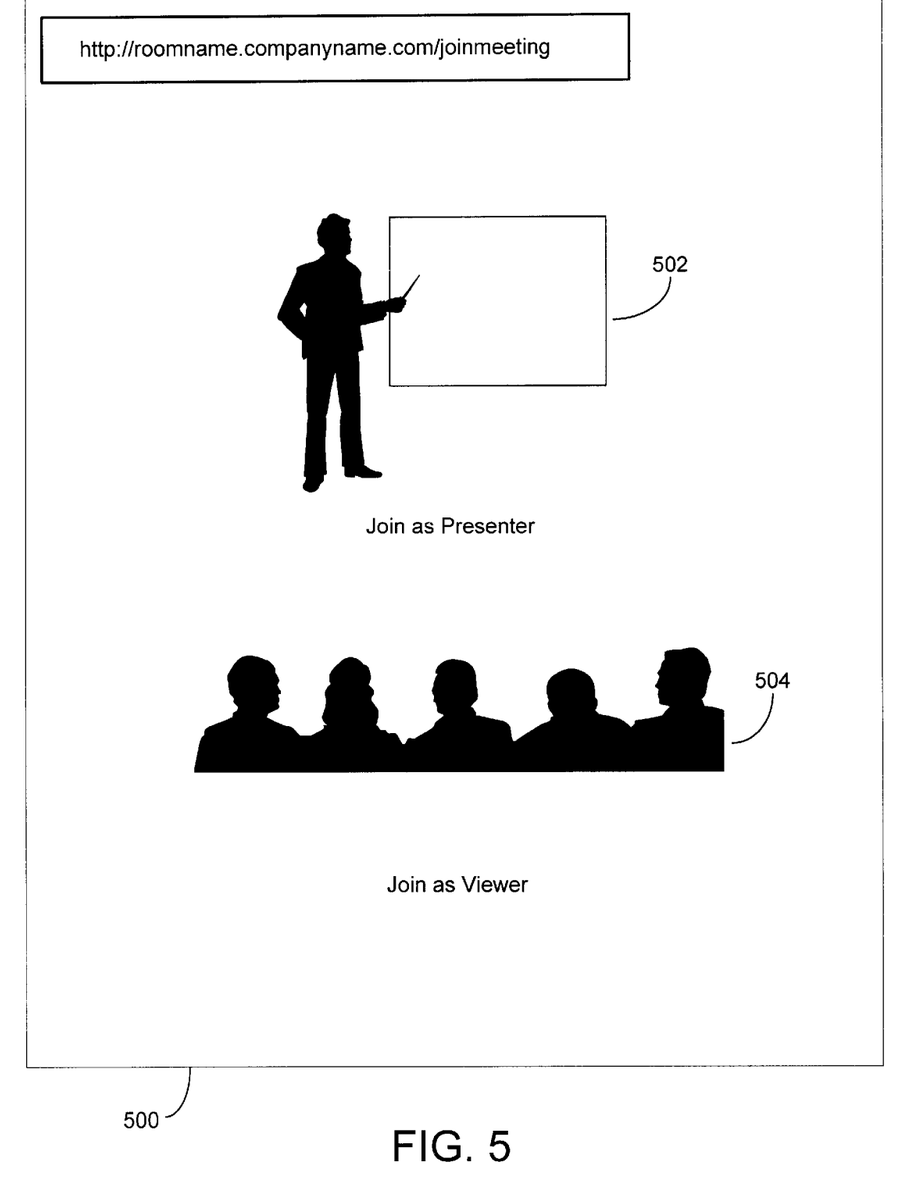
FIG. 5 is an exemplary web page setting forth options for joining a presentation session.

FIG. 5 is an exemplary web page 500 corresponding to "join a meeting" option 404. Selection of "join a meeting" option 404 of home page 400 causes the browser to send a request for corresponding web page 500 to web server 304 of presentation device 100, and web server 304 responsively transmits web page 500 (again, typically in HTML-encoded format). Web page 500 displays an additional set of more specific options, including a "join as presenter" option 502 and a "join as viewer" option 504. As will be discussed in further detail in connection with FIG. 7, selection of "join as presenter" option 502 enables the user to remotely give a presentation, i.e., to control various aspects of the presentation, such as identification of presentation file 306, advancing slides, and the like, in addition to viewing slides. Selection of "join as viewer" option 504 allows the user to view slides and other presentation information without conferring presenter privileges to the user.

Figure 6:
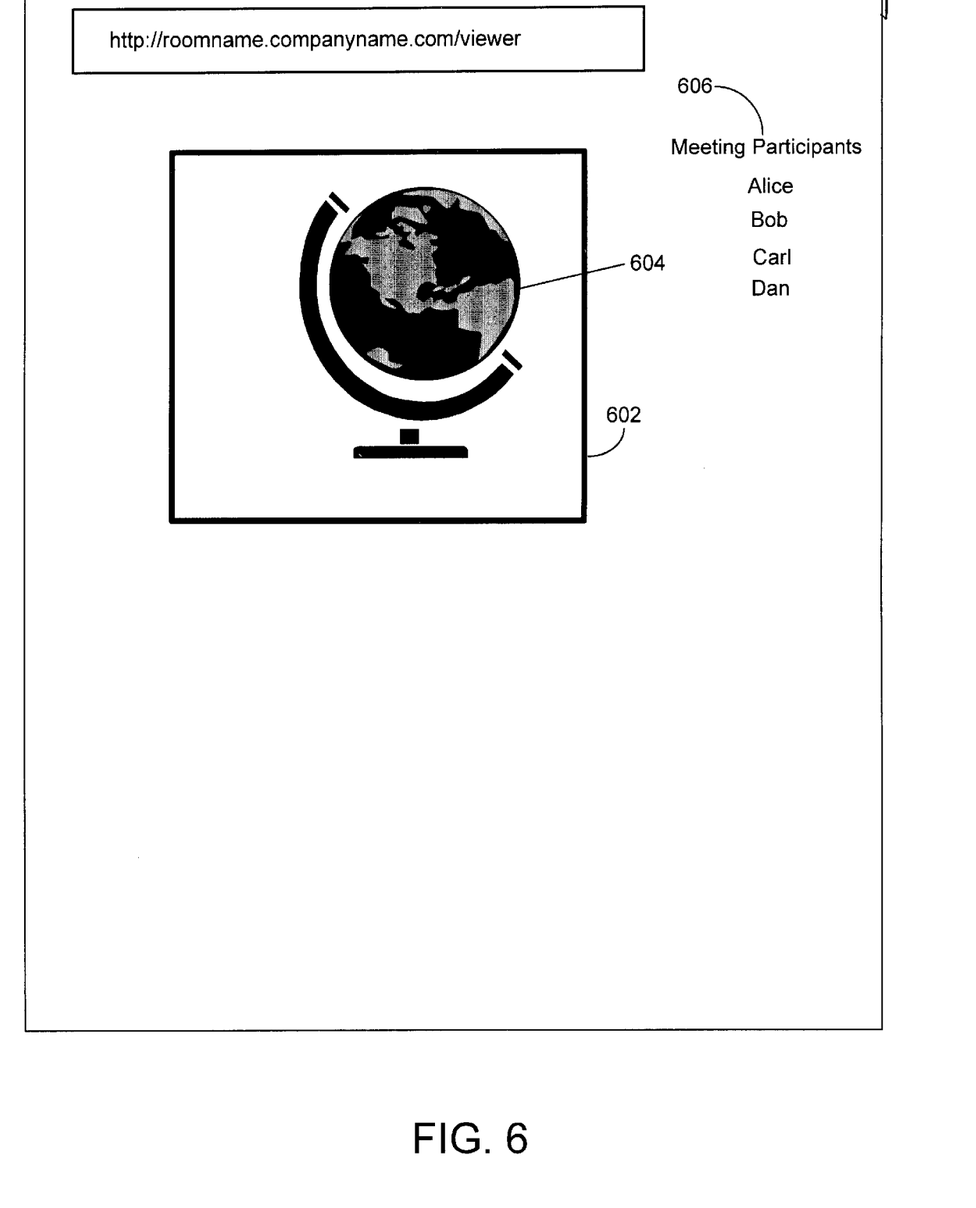
FIG. 6 is an exemplary web page displayed at a "viewer" terminal.

FIG. 6 is an exemplary web page 600 corresponding to "join as viewer" option 504. Responsive to selection of "join as viewer" option 504 (and optional authentication of the user, as will be discussed below in connection with FIG. 8), web server 304 transmits web page 600, which includes a script or applet(s) for generating a presentation window 602 in which is displayed an image 604 of the current slide (the slide currently being viewed at the presentation site). The slide images are preferably formatted as JPEG (compressed image) files to facilitate rapid transmission thereof from presentation device 100 to terminal 104 over LAN 102 and/or Internet 110. As the current slide is changed (responsive to input received by presentation device 100 either through user controls 222 or from a presenter-enabled terminal), a new slide image is transmitted by web server 304 to terminal 104 so that the new slide is displayed in presentation window 602 and may be viewed by the user of terminal 104. Web page 600 may also include a list 606 identifying all persons currently participating (either as presenters or viewers) in the presentation session.

Figure 7:
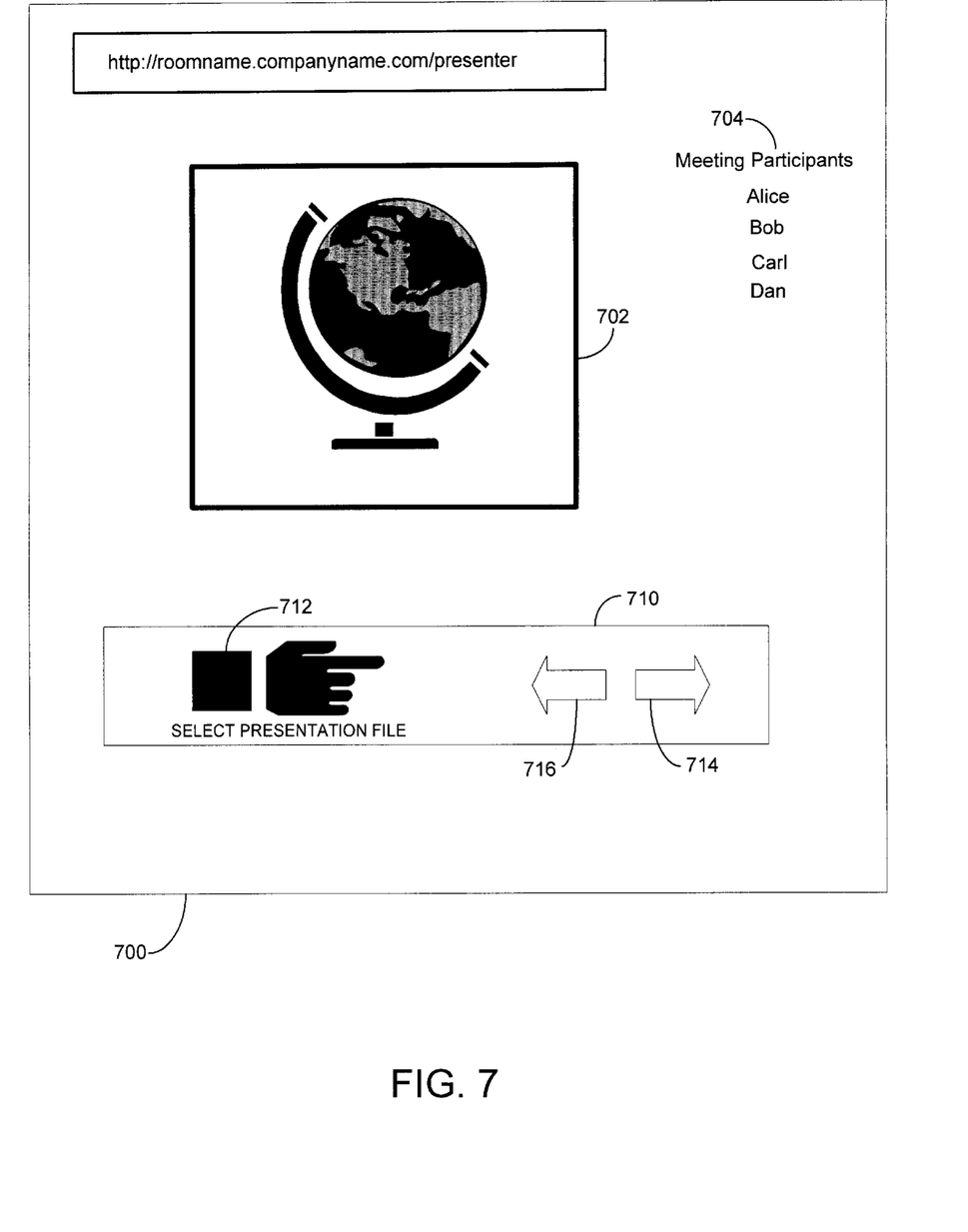
FIG. 7 is an exemplary web page displayed at a "presenter" terminal.

FIG. 7 depicts an exemplary web page 700 corresponding to "join as presenter" option 502. Web page 700 is seen to include a presentation window 702 and user list 704 similar to those described above in connection with FIG. 6. Web page 700 additionally includes a presentation toolbar 710 having a set of controls or options for remotely giving a presentation. In particular, presentation toolbar 710 has a "select presentation file" option 712 allowing the user to select a presentation file (from presentation files 306 stored at presentation device 100) to be presented to the audience at the presentation site as well as to the users of remote terminals 104 connected to presentation device 100. Presentation toolbar 710 also provides a "next slide" control 714 for causing presentation device 100 to display and transmit to remote terminals 104 the next slide in the presentation, and a "previous slide" control 716 for causing presentation device 100 to display and transmit to remote terminals 104 a previously viewed slide in the presentation. Those skilled in the art will recognize that toolbar 710 and associated options and controls 712, 414 and 716 may be generated by embedding appropriate scripts or applets within web page 700.

Figure 8:
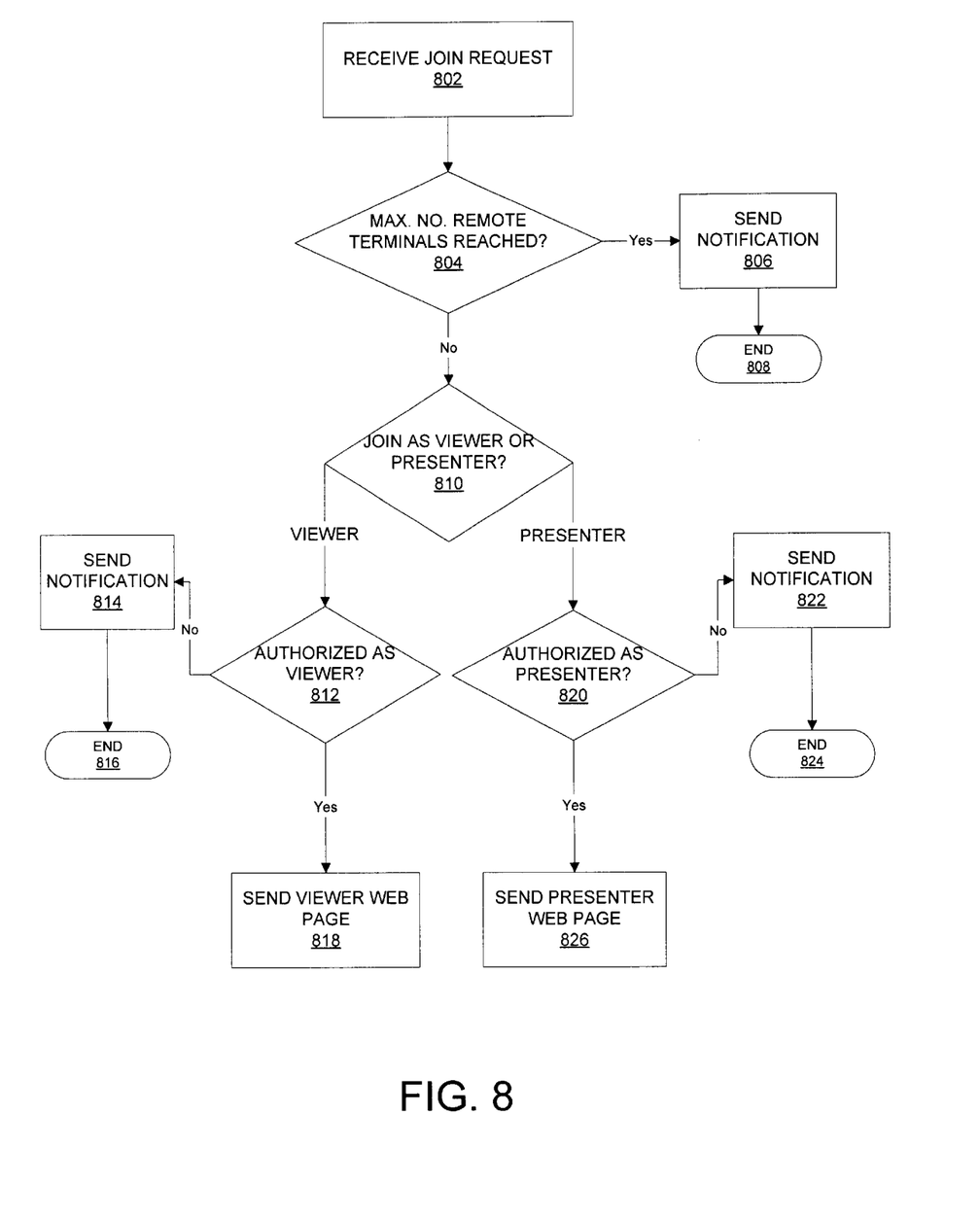
FIG. 8 is a flowchart depicting steps of a method for enabling terminals to join a presentation session.

FIG. 8 is a flowchart depicting the process of joining a remote terminal 104 to a presentation session conducted on presentation device 100. In step 802, a join request is received at presentation device 100 from remote terminal 104. The join request is transmitted by a browser executing on remote terminal 104 responsive to selection of "join as presenter" option 502 or "join as viewer" option 504. Next, web server 304 determines if the maximum number of remote terminals 104 have been joined to the presentation session, step 804. As alluded to above, a typical embodiment of presentation device 100 will accommodate a maximum of 25 users. If it is determined in step 804 that the maximum number of remote terminals 104 joined to the presentation session has been reached, a notification of such is sent to the requesting terminal 104, step 806, and the process ends, step 808.

If the maximum number of remote terminals has not been reached, web server 304 determines whether the join request is a "join as presenter" request (generated by selecting "join as presenter" option 502), or a "join as viewer" request (generated by selecting "join as viewer" option 504), step 810. If the join request is a "join as viewer" request, web server 304 may invoke authentication routines 316 to ensure that the user of the requesting terminal 104 is authorized to join the presentation session, step 812. This step 812 may be performed by sending an authentication page having a dialog box prompting the user of requesting terminal 104 to enter a user name and/or a password. This information is then transmitted to web server 304, which causes authentication routines 316 to determine if the received user name is on the list of authorized presentation viewers and/or if the received password is correct. If the user is not authorized to view the presentation or if an incorrect password has been entered, notification of this condition is sent to requesting terminal 104, step 814 and the method ends, step 816.

If it is determined in step 812 that the user of requesting terminal 104 is authorized to view the presentation session, then web server 304 transmits web page 600 to requesting terminal 104, step 818. As discussed above in connection with FIG. 6, web page 600 includes presentation window 602 in which is displayed the slide or document currently being viewed at the presentation site. Web page 600 may also include a list of user names of other meeting participants.

If the join request is a "join as presenter" request, web server 304 invokes authentication routines 316 to ensure that the user of requesting terminal 104 is authorized to participate in the presentation session, and additionally holds presenter privileges for the session, step 820. Authentication routines may be configured so that users hold presenter privileges generally (i.e., for all presentation sessions), or only for a specific presentation session. Authentication will typically be accomplished by requiring the user to enter a user name and/or password. If authentication routines 316 determine that the user is not authorized to participate in the presentation session, does not have presenter privileges for the session, or has entered an incorrect password, then notification of such is sent to requesting terminal 104, step 822 and the method ends, step 824.

If it is found by authentication routines 316 that the user is authorized to join the presentation session and also holds presenter privileges, then web server 304 transmits web page 700 to requesting terminal 104, step 826. As discussed above in connection with FIG. 7, web page 700 includes, together with a presentation window 702 and user name list 704, a presentation toolbar 710 enabling the user to control various aspects of the presentation, such as presentation file selection and advancing slides.

Figure 9:
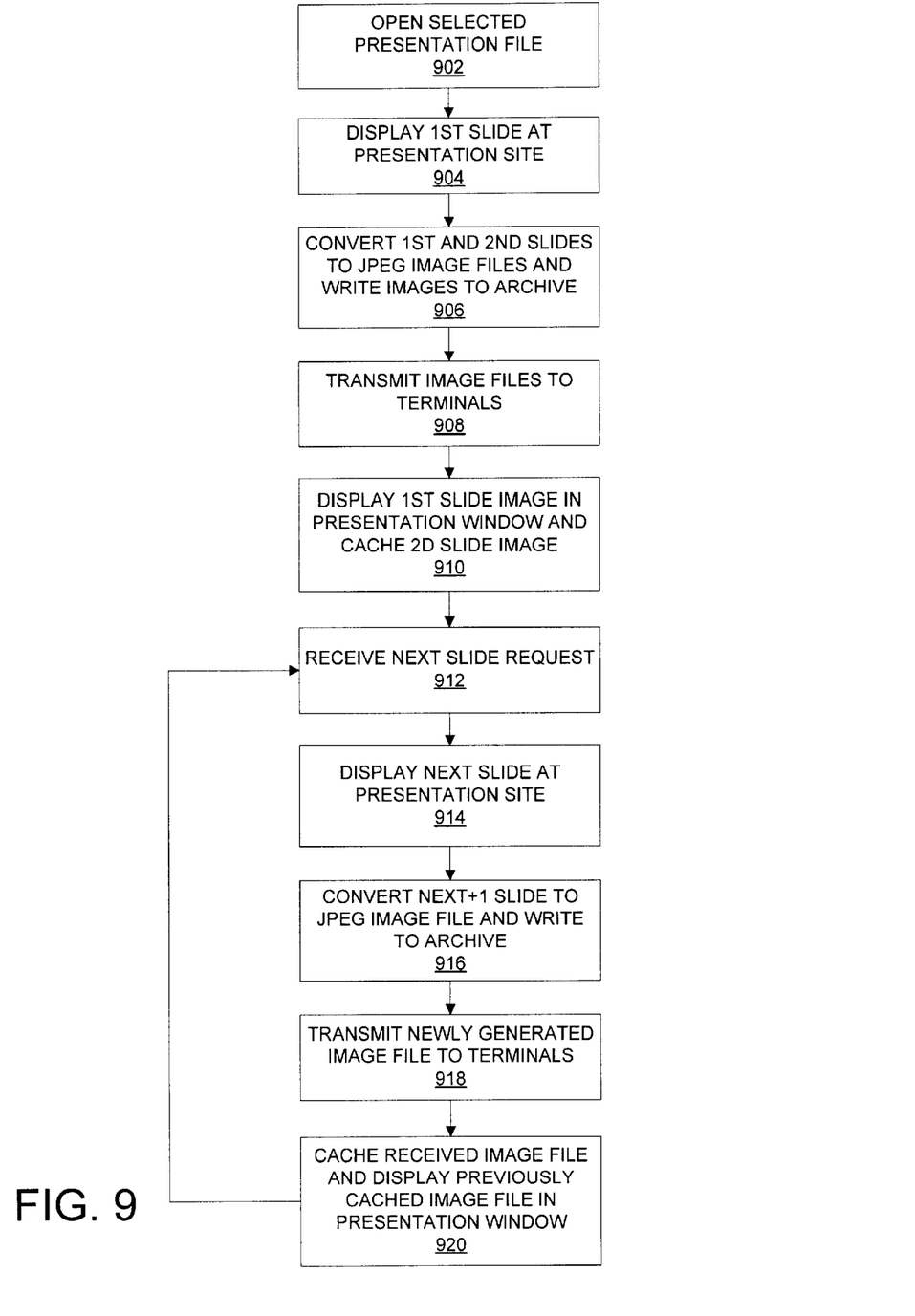
FIG. 9 is a flowchart depicting steps of a method for distributing presentation images during a presentation session.

FIG. 9 depicts the steps of a process for distributing slide images to terminals 104 joined to the presentation session. While the process is described in relation to slides, it may be used in connection with other types of presentation information.

In step 902, a selected presentation file 306 is opened by presentation device 100. Selection of presentation file 306 may be performed locally through user interface 314, or remotely using presentation toolbar 710. Next in step 904, viewer 308 causes a first slide of presentation file 306 to be displayed at the presentation site, preferably by directing its output to LCD projector 220. Substantially simultaneously with step 904, conversion engine 310 converts the first and second slides of presentation file 306 to JPEG-formatted image files 312, step 906. Conversion of the slides from a proprietary format to JPEG files allows the slide images to be viewed in a conventional browser running on remote terminal 104 without requiring plug-ins or special software. Image files 312 are also written to presentation archives 318 for subsequent retrieval or printing.

Web server 304 then transmits image files 312 corresponding to the first and second slides to all remote terminals 104 joined to the presentation session, step 908. In accordance with instructions embedded in web page 600 or 700, image file 312 corresponding to the first slide is decoded and displayed in presentation window 602 or 702, step 910. Also in step 910, image file 312 corresponding to the second slide is stored, or cached, in the memory of remote terminals 104. Caching of slide image files 312 advantageously avoids latency associated with transmission of a new slide image file and allows slides to be displayed substantially simultaneously at the presentation site and at remote terminals 104.

Next, in step 912, presentation device 100 awaits a next slide request, which may be generated locally (as by depressing a key on user controls 222 or remotely (by engaging a control on toolbar 710). Responsive to the next slide request, viewer 308 causes the next slide (the slide sequentially following the currently displayed slide) to be displayed at the presentation site, step 914. Conversion engine 310 then converts to a JPEG image file the slide sequentially following the next slide, step 914. For example, if the first slide of a sequence is being displayed at the presentation site, reception of a next slide request will cause the second slide to be displayed at the presentation site and a JPEG image file corresponding to the third slide to be generated by conversion engine 316. In step 918, the newly generated image file is then transmitted by web server 304 to remote terminals 104, where it is cached for later display, and is additionally written to archives 318. Web server 304 also transmits an instruction to remote terminals 104 to cause the previously cached image file to be displayed in presentation window 602 or 702, step 920. In the example set forth above, the previously cached image file will correspond to the second slide. The process then returns to awaiting a next slide request, step 912.

Those skilled in the art will recognize that previously displayed image files may also be cached at the remote terminals to enable rapid display thereof (i.e., avoiding the need to re-transmit the previously displayed image file) should the presenter wish to return to the previously displayed slides for further review or clarification.

It will also be recognized by those skilled in the art that, while the invention has been described above in terms of preferred embodiments, it is not limited thereto. Various features and aspects of the above-described invention may be used individually or jointly. Further, although the invention has been described in the context of its implementation in a particular environment and for particular applications, those skilled in the art will recognize that its usefulness is not limited thereto and that the present invention can be utilized in any number of environments and implementations.

What is claimed is:

1. A presentation device, comprising:
   a viewer for reading a presentation file containing presentation information, and for causing the presentation information to be displayed at a presentation site;
   a network interface for coupling the presentation device to a network; and
   a web server embedded in the presentation device, for transmitting a web page to at least one remote terminal connected to the network, the web page including the presentation information currently being displayed at the presentation site;
   whereby a user of the at least one remote terminal may view the presentation information substantially simultaneously with persons located at the presentation site.

2. The presentation device of claim 1, wherein the presentation device is configured to be coupled to a digital projector for displaying the presentation information.

3. The presentation device of claim 1, wherein the web page includes a presenter toolbar enabling the user of the at least one remote terminal to remotely control the presentation.

4. The presentation device of claim 3, wherein the presenter toolbar includes a next slide control for causing the presentation device to display the next slide in the presentation file, and a previous slide control for causing the presentation device to display the previous slide in the presentation file.

5. The presentation device of claim 3, wherein the presenter toolbar includes a select presentation file option for identifying a selected presentation file for display by the presentation device.

6. The presentation device of claim 1, wherein the presentation information includes slides.

7. The presentation device of claim 6, wherein the presentation device is configured to store all slides displayed during a presentation session as an archive file, and said web browser is configured to transmit the archive file responsive to an appropriate request received over the network.

8. The presentation device of claim 1, further including a conversion engine for converting the presentation information from a proprietary format to a standard image format prior to its transmission to the at least one remote terminal, whereby the presentation information may be displayed by a conventional browser running on the at least on remote terminal.

9. The presentation device of claim 8, wherein images representative of presentation information are cached at the at least one remote terminal to facilitate rapid display of presentation information.

10. The presentation device of claim 1, wherein the web server includes authentication routines for determining if a user of the at least one remote terminal is authorized to access the presentation information.

11. The presentation device of claim 10, wherein the authentication routines are configured to determine if the user of the at least one remote terminal is authorized to act as a presenter.

* * * * *